United States Patent [19]

Councilman

[11] Patent Number: 4,650,134
[45] Date of Patent: Mar. 17, 1987

[54] DUAL ANTI-REVERSE AND SELF-CENTERING MECHANISM FOR SPINNING REELS

[75] Inventor: Richard R. Councilman, Collinsville, Okla.

[73] Assignee: Brunswick Corporation, Skokie, Ill.

[21] Appl. No.: 758,759

[22] Filed: Jul. 25, 1985

[51] Int. Cl.$^4$ ............................................. A01K 89/01
[52] U.S. Cl. .......................... 242/84.2 G; 242/84.1 R; 188/82.3
[58] Field of Search ...................... 242/84.1 R, 84.2 R, 242/84.2 G, 84.21 R; 188/82.3, 82.34, 82.4

[56] References Cited

U.S. PATENT DOCUMENTS

| | | |
|---|---|---|
| 2,773,655 | 12/1956 | Mandolf . |
| 3,138,344 | 6/1964 | Small ................................ 188/82.3 |
| 3,144,217 | 8/1964 | Wood, Jr. ...................... 242/84.21 R |
| 4,193,562 | 3/1980 | Gifford ........................... 242/84.2 G |
| 4,208,020 | 6/1980 | Gifford . |
| 4,340,189 | 7/1982 | Volkert et al. ................. 242/84.1 R |

FOREIGN PATENT DOCUMENTS 52-26469  6/1977  Japan ............................ 242/84.21 R Primary Examiner—Billy S. Taylor
Attorney, Agent, or Firm—Wood, Dalton, Phillips, Mason & Rowe

[57] ABSTRACT

A dual anti-reverse and self-centering mechanism is disclosed for use in an open face style spinning reel. The mechanism provides for multiple stop positions for the reel rotor in a counterclockwise direction. The mechanism also provides a centering position for the rotor with the bail located in the most advantageous position for pivoting to the casting position. Both functions can be enabled by actuating an actuator for the bail centering mechanism.

17 Claims, 5 Drawing Figures

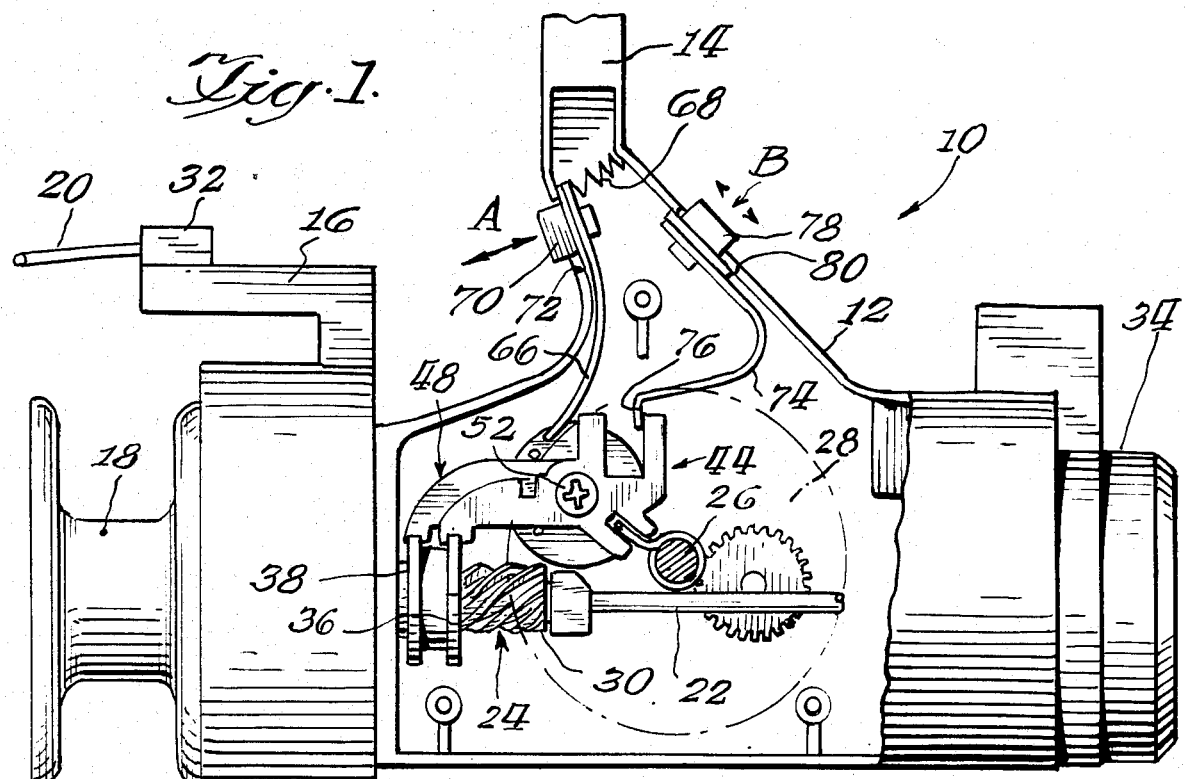
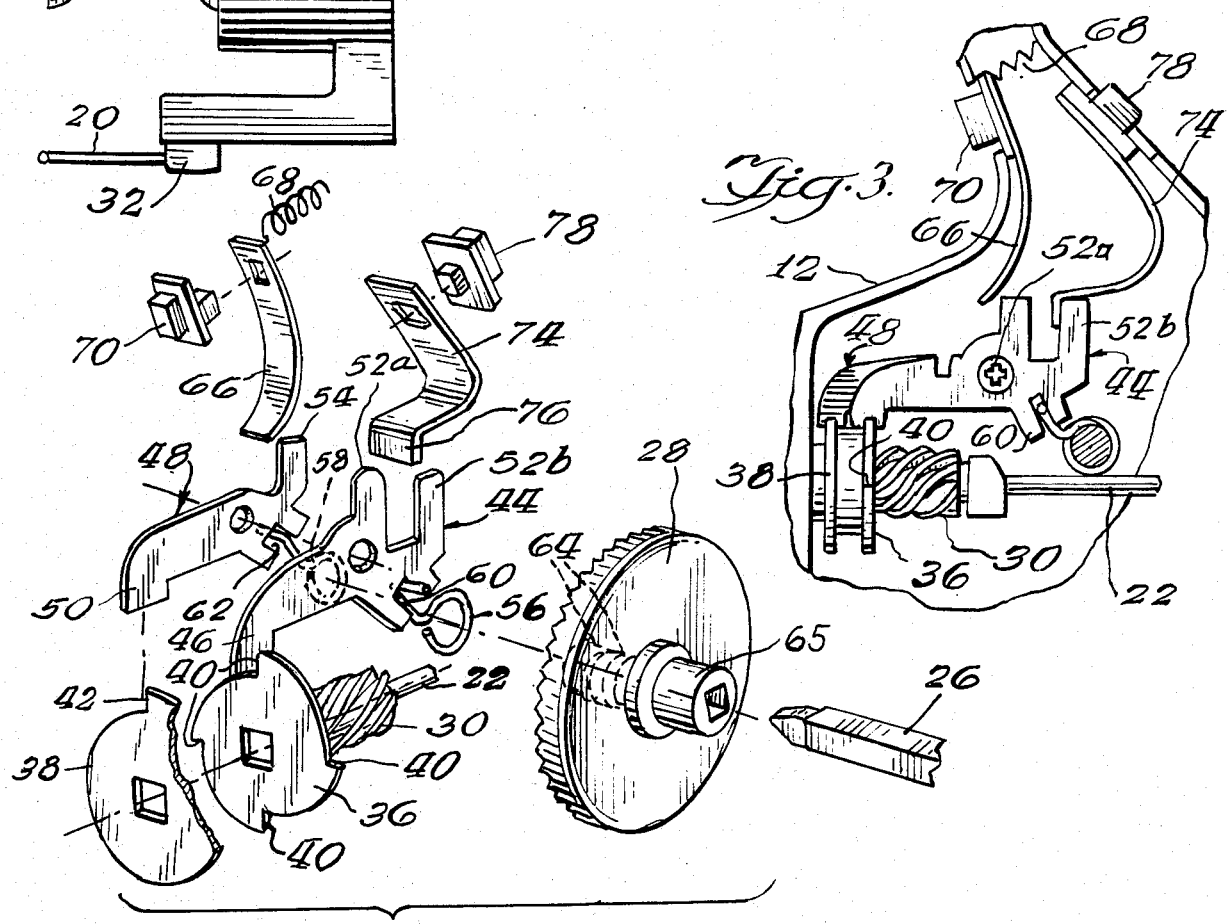

DUAL ANTI-REVERSE AND SELF-CENTERING MECHANISM FOR SPINNING REELS

BACKGROUND OF THE INVENTION

This invention relates to spinning type fishing reels and, more particularly, to self-centering and anti-reverse mechanisms for such reels.

It is known in the prior art that it is possible to incorporate an anti-reverse and self-centering bail mechanism into a spinning style fishing reel. A particular mechanism was first employed by the Langley Manufacturing Company about 20-25 years ago and is taught in U.S. Pat. No. 2,773,655. This particular mechanism was incorporated inside the rotor and external of the gear housing of the fishing reel. The Langley device had limited use and constantly caused a problem for fishermen in that in order to use the device a fisherman would have to get his hands in the way of the fishing line. It became obvious that this desirable self-centering and antireverse feature if incorporated in the back of a reel would be quite advantageous. Many spinning reels were made thereafter incorporating the ant-reverse mechanism that was operated at the rear of the fishing reel but no such incorporation was made for the self-centering bail feature.

An improved mechanism is taught in U.S. Pat. No. 4,208,020 to Gifford, dated June 17, 1980, and assigned to the assignee of this invention. Gifford teaches the incorporation of both an anti-reverse and a self-centering bail mechanism and locates the mechanism within the gear housing of the reel and not within the rotor. By locating the mechanism in the gear housing the means for bringing the self-centering and antireverse feature into operation can be located at the back of the reel out of the way of the fishing line.

However, the Gifford mechanism is designed to permit up to one counterclockwise rotation of the winding cup to bring the bail into the most advantageous position for pivoting to the casting position. The present invention is directed to providing a further improvement wherein a multiple stop device is provided for the rotor in a counterclockwise direction while still affording the anti-reverse and self-centering feature for advantageously locating the bail.

SUMMARY OF THE INVENTION

An object, therefore, of the invention is to provide a new and improved self-centering and anti-reverse mechanism in a spinning type fishing reel, and wherein the mechanism further provides for multiple stop positions for the rotor in a counterclockwise direction.

In the exemplary embodiment of the invention, a dual anti-reverse and self-centering mechanism is designed for use in an open face spinning reel used for casting a bait attached to a fishing line and for retrieving the bait and fishing line after casting. The reel includes a housing, a center shaft mounted in the housing, a spool mounted on the shaft for holding the fishing line, a pinion gear assembly rotatably journaled in the housing coaxial with the center shaft, a handle and gear train mounted on the housing and operatively associated with the pinion gear assembly, and a rotor mounted on the pinion gear assembly and rotatable by cooperative movement of the handle and gear train and pinion gear assembly. A movable bail is mounted on the rotor and has an open casting position and a closed retrieving position, whereby preselected stopping of counterclockwise rotation of the rotor provides a self-centering position rotor for opening the bail.

The dual anti-reverse and self-centering mechanism of this invention includes a first ratchet mounted on the pinion gear assembly and rotable therewith, the first ratchet defining multiple stop positions for the rotor in a counterclockwise direction. A first pawl is engageable with the first ratchet. First actuator means are operatively associated with the first pawl for selectively moving the first pawl out of engagement with the first ratchet. A second ratchet is mounted on the pinion gear assembly for conjoint rotation therewith, the second ratchet defining a centering position for the rotor with the bail located in the most advantageous position for pivoting to the casting position. A second pawl is engageable with the second ratchet. Second actuator means are operatively associated with the second pawl for selectively moving the second pawl out of engagement with the second ratchet. Preferably, the second actuator means for positioning the bail also is operatively associated with the first pawl for moving the first pawl out of its multi-stop engagement with the first ratchet simultaneously with moving the second pawl out of engagement with the second or bail positioning ratchet.

As disclosed herein, the first and second pawls are defined by forward ends of arms pivotally mounted intermediate their ends in the housing, the opposite ends of the arms being operatively associated with their respective actuator means. The opposite ends of both arms are operatively associated with the second actuator means. The housing has a pair of openings through which respective movable buttons project from the first and second actuator means. One opening is located at the rear of the housing for easy manipulation of the respective button by an operator's thumb, and the other opening is located at the front of the housing for easy manipulation of the respective button by an operator's forefinger. Lastly, spring means are provided for biasing the pawls into engagement with their respective ratchets. The spring means are anchored on a shaft for the handle and gear train of the reel.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a fragmented, partially sectioned elevation of a spinning reel incorporating the invention;

FIG. 2 is an exploded perspective view of the dual anti-reverse and self-centering mechanism;

FIG. 3 is a fragmented elevation illlustrating both pawls of the mechanism in engagement with their respective ratchets;

DETAILED DESCRIPTION OF THE PREFERRED EMBODIMENT

Figure 4:
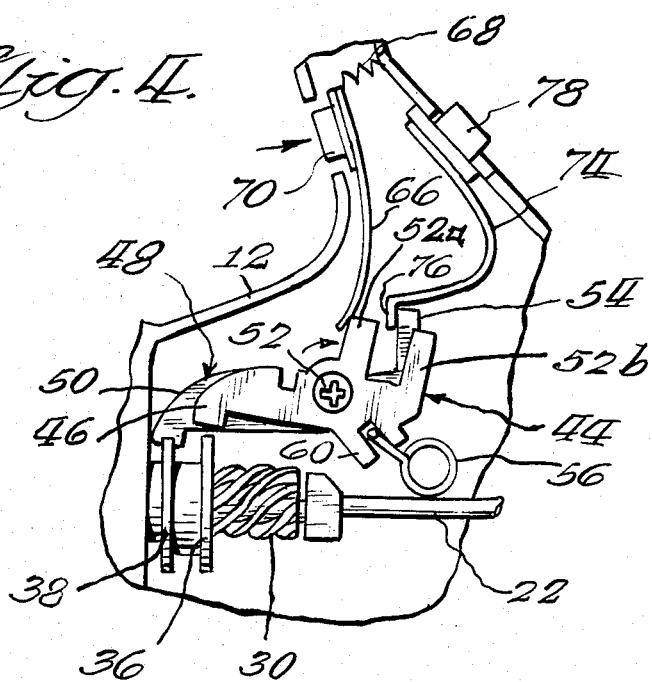
FIG. 4 is a view similar to that of FIG. 3, with the respective pawl out of engagement with the multi-stop ratchet.

Referring to the drawings in greater detail, and first to FIG. 1, a conventional style open-face fishing reel is shown and generally designated 10. The reel has a housing 12 defining a gear case, and a stem 14 which has an integral conventional shoe (not shown) used to attach the reel to spinning style fishing rods. The reel includes a crank assembly (not shown) which is conventional and includes a winding handle for use normally by a fisherman with his left hand for line retrieval while the rod is being held by the right hand. However, some reels of the style shown herein may accommodate mounting the handle on the other side of the housing for accommodating the personal desires of the user.

An axially mounted rotor 16 is provided and adapted to rotate about the axis of a spool 18 as the crank assembly is turned for line retrieval. The line is captured by a bail 20 passing over a line guide assembly (not shown). The bail and line guide rotate with rotor 16 and the line is thereby wound on spool 18. A conventional internal mechanism causes line spool 18 to reciprocate axially back and forth as the rotor winds the line about the spool, but as in spinning reels generally, the spool does not rotate about its central core axis, except as controllably permitted by the adjustment of a drag mechanism.

Rotor 16 and bail 20 are mounted on the forward end of a central reel shaft 22 in housing 12 for rotation thereby. A pinion gear assembly 24 is forwardly rotatably journaled in housing 12 and is operatively associated with the crank assembly for conjoint rotation of the pinion gear assembly, center shaft 22 and rotor 16. In particular, the crank assembly for the reel winding handle incorporates a gear train which includes a cup gear 28 mounted on crank shaft 26 for rotation thereby. The cup gear is in mesh with an axially mounted worm gear 30 of pinion gear assembly 24. Therefore, rotating the winding handle and gear train by an operator causes rotation of rotor 16 and bail 20. As is known, the bail is mounted on the rotor for pivoting about a transverse axis defined by bail arms 32 on rotor 16 between an open casting position and a closed retrieving position. Lastly, a conventional drag mechanism is provided in operative association with center shaft 22 and includes a rear drag control knob 34.

The invention includes a combined anti-reverse and self-centering bail feature that can be selectively activated. In all spinning reels there is one best position in which to open the bail for casting. This is normally when the bail is in generally vertical alignment with stem 14. Concomitantly, reels need a device that prevents the rotor from rotating backward or in the counterclockwise direction when the reel is viewed from the face or the spool end. It also is desirable to provide an automatic mechanism that causes the bail to move from the casting position to the retrieve position by simply turning the handle as required. This invention provides such features and, in addition, provides a multi-stop feature which defines multiple stop positions for the rotor in the counterclockwise direction.

More particularly, pinion gear assembly 24 includes a first or multi-stop ratchet 36 and a second or bail positioning ratchet 38, both mounted for conjoint rotation with pinion gear 30. Multi-stop ratchet 36 includes a plurality of stop shoulders 40 of a given number, four being shown in FIG. 2. Bail positioning ratchet 38 includes a single stop shoulder 42 that permits no more than one counterclockwise rotation of the rotor and bail and defines the most advantageous position for the bail to be pivoted to its casting position. The outer peripheries of both ratchets are gradually curved inwardly from each stop shoulder to provide a smooth transition on winding in the clockwise direction.

The dual anti-reverse and self-centering mechanism further includes a first pawl, generally designated 44, having a forward pawl end 46 engageable with multi-stop ratchet 36. A second pawl, generally designated 48, has a forward pawl end 50 engageable with bail centering ratchet 38. Both pawls are pivotally mounted within housing 12 on a pivot shaft 52 (FIG. 1).

The rear end of multi-stop pawl 44 is provided with a pair of actuator engaging tabs 52a and 52b, and the rear end of bail centering pawl 48 is provided with a single actuator engaging tab 54, for purposes described in greater detail hereinafter. Springs 56 and 58 are provided for engaging within notches 60 and 62 of pawls 44 and 48, respectively, for biasing the pawls into engagement with their respective ratchets. The springs are frictionally engaged with the crank shaft 26 through notches 64 in sleeve 65 on gear 28 (FIG. 2) for biasing the pawls into engagement with the ratchets when the handle is turned in one direction. This provides the automatic means that causes the bail and rotor to move from the casting and/or stop position(s) to the retrieve position by simply turning the handle of the reel as required.

First actuator means are provided operatively associated wtih multi-stop pawl 44 for selectively moving the pawl out of engagement with multi-stop ratchet 36. More particularly, an actuator arm 66 is mounted within housing 12 and is biased toward an inoperative position by a coil spring 68. A pushbutton 70 is fixed to the upper end of actuator arm 66 and projects through a forward opening 72 in housing 12 for easy manipulation by an operator's forefinger in the direction of double-headed arrow "A" (FIG. 1). Actuator arm 66 is positioned for engagement with forward actuator engaging tab 52a of multi-stop pawl 44. Therefore, pushing button 70 into housing 12 causes actuator arm 66 to engage actuator engaging tab 52a of pawl 44 and pivots the front pawl end 46 upwardly out of engagement with multi-stop ratchet 36.

Second actuator means are provided operatively associated with bail centering pawl 48 for selectively moving the pawl out of engagement with bail centering ratchet 38. More particularly, a second actuator arm 74 has a hook portion 76 at its lower end and a slide button 78 at its upper end. The slide button projects through an opening 80 at the rear of housing 12 for easy manipulation by an operator's thumb in the direction of double-headed arrow "B" (FIG. 1). Actuator arm 74 is engageable with actuator engaging tab 54 of self-centering pawl 48 for pivoting the forward pawl end 50 upwardly and out of engagement with self-centering ratchet 38, upon sliding actuator arm 74 and button 78 downwardly and rearwardly relative to housing 12.

A feature of the invention includes provision for second actuator arm 74 to effectively move both pawls 44 and 48 out of engagement with their respective ratchets upon selectively moving the actuator arm. More particularly, it can be seen in FIG. 2 that actuator arm 74 is wider than actuator arm 66. In other words, actuator arm 66 is only narrow enough to engage the actuator engaging tab 52a of multi-stop pawl 44. However, actuator arm 74 is sufficiently wide to engage both the actuator engaging tab 52b of multi-stop pawl 44 as well as actuator engaging tab 54 of bail centering pawl 48. Therefore, whenever an operator wishes to effect the anti-reverse and self-centering mechanism for the bail, the multi-stop mechanism also is rendered ineffective.

Figure 5:
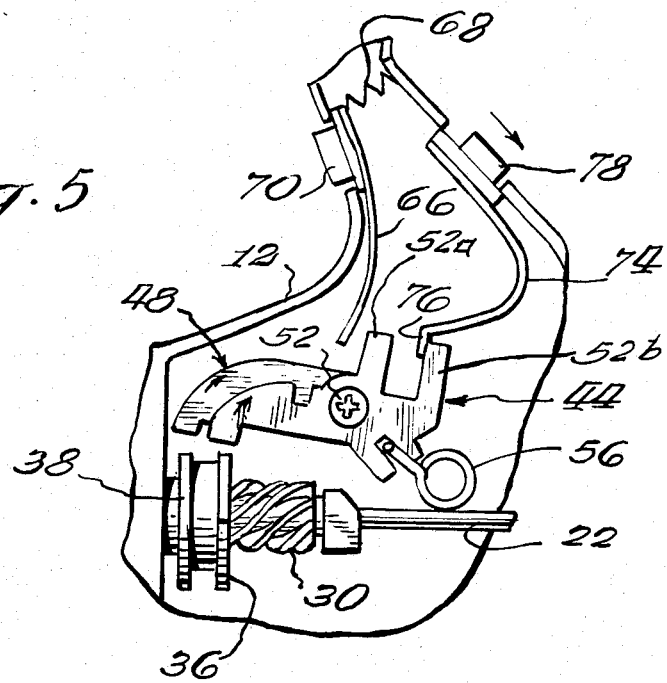
FIG. 5 is a view similar to that of FIGS. 3 and 4, with both pawls out of engagement with their respective ratchets.

FIGS. 3-5 show various positions of operation between pawls 44 and 48 and ratchets 36 and 38, respectively. More particularly, FIG. 3 shows both pawls 44 and 48 respectively in engagement with ratchets 36 and 38, with the respective actuator arms 74 and 66 in inoperative position.

FIG. 4 shows multi-stop actuator arm 66 moved rearwardly by pushbutton 70 to lift pawl 44 out of engagement with multi-stop ratchet 36. This leaves the self-centering mechanism for the bail still operative.

FIG. 5 shows both pawls 44 and 48 lifted out of engagement with their respective ratchets simply by moving actuator arm 74 rearwardly by sliding button 78, as by an operator's thumb. This renders both the multi-stop mechanism and the bail self-centering mechanism of the invention ineffective.

Other objects, features and advantages of the invention will be apparent from the following detailed description taken in connection with the accompanying drawings.

I claim:

1. In an open face spinning reel used for casting a bait attached to a fishing line and for retrieving the bait and fishing line after casting, the reel having a housing, a center shaft mounted in the housing, a spool mounted on the shaft for holding the fishing line, a pinion gear assembly rotatably journaled in the housing coaxial with the center shaft, a handle and gear train mounted on the housing and operatively associated with the pinion gear assembly, a rotor mounted on the pinion gear assembly and rotatable by cooperative movement of the handle and gear train and pinion gear assembly, and a movable bail mounted on the rotor and having an open casting position and a closed retrieving position, whereby preselected stopping of counterclockwise rotation of the rotor provides a self-centering rotor position for opening the bail, a dual anti-reverse and self-centering mechanism comprising:
   a first ratchet mounted on the pinion gear assembly and rotatable therewith, the first ratchet defining multiple stop positions for the rotor in a counterclockwise direction;
   a first pawl engageable with the first ratchet;
   first actuator means operatively associated with the first pawl for selectively moving the first pawl out of engagement with the first ratchet, including a first actuator member projecting through the housing on one side thereof;
   a second ratchet mounted on the pinion gear assembly and rotatable therewith, the second ratchet defining a centering position for the rotor with the bail located in the most advantageous position for pivoting to the casting position;
   a second pawl engageable with the second ratchet; and
   second actuator means separate from and operable independently of said first actuator means and operatively associated with the second pawl for selectively moving the second pawl out of engagement with the second ratchet, including a second actuator member projecting through the housing on another side thereof.

2. The reel of claim 1 wherein said second actuator means includes means operatively associated with the first pawl for moving the first pawl out of engagement with the first ratchet simultaneously with moving the second pawl out of engagement with the second ratchet.

3. The reel of claim 1 wherein said first pawl is defined by one end of an arm pivotally mounted intermediate its ends to the housing, an opposite end of the arm being operatively associated with the first actuator means.

4. The reel of either of claims 1 or 3 wherein said second pawl is defined by one end of an arm pivotally mounted intermediate its ends to the housing, an opposite end of the arm being operatively associated with the second actuator means.

5. The reel of claim 4 wherein the opposite ends of both said arms include means operatively associated with the second actuator means.

6. The reel of claim 1, including spring means for biasing at least one of said pawls into engagement with its respective ratchet.

7. The reel of claim 6 wherein said spring means is anchored on a shaft for the handle and gear train of the reel.

8. The reel of claim 1 wherein the first actuator member comprises a movable button projecting through an opening in the housing.

9. The reel of claim 8 wherein said opening and button are located at the rear of the housing for easy manipulation by an operator's thumb.

10. The reel of claim 1 wherein the second actuator member comprises a movable button projecting through an opening in the housing.

11. The reel of claim 10 wherein said opening and button are located at the front of the housing for easy manipulation by an operator's forefinger.

12. In an open face spinning reel used for casting a bait attached to a fishing line and for retrieving the bait and fishing line after casting, the reel having a housing, a center shaft mounted in the housing, a spool mounted on the shaft for holding the fishing line, a pinion gear assembly rotatably journaled in the housing coaxial with the center shaft, a handle and gear train mounted on the housing and operatively associated with the pinion gear assembly, a rotor mounted on the pinion gear assembly and rotatable by cooperative movement of the handle and gear train and pinion gear assembly, and a movable bail mounted on the rotor and having an open casting position and a closed retrieving position, whereby preselected stopping of counterclockwise rotation of the rotor provides a self-centering rotor position for opening the bail, a dual anti-reverse and self-centering mechanism comprising:
   first and second ratchets mounted on the pinion gear assembly for conjoint rotation therewith, one of the ratchets defining multiple stop positions for the rotor in a counterclockwise direction and the other ratchet defining a centering position for the rotor with the bail located in the most advantageous position for pivoting to the casting position;
   first and second pawls respectively engageable with the first and second ratchets;
   first and second actuator means separate from and operable independently of each other and operatively associated respectively with the first and second pawls for selectively moving the pawls out of engagement respectively with the first and second ratchets, the actuator means for the first pawl also being operatively associated with the second pawl for moving the second pawl out of engagement with the second ratchet simultaneously with moving the first pawl out of engagement with the first ratchet; and said housing having a pair of openings for access to said first and second actuator means, one of the openings being located in the housing for access to one of said actuator means for easy manipulation by an operator's thumb and the other opening being located in the housing for access to the other actuator means for easy manipulation by an operator's forefinger.

13. The reel of claim 12 wherein each of said first and second pawls are defined by forward ends of an elongated arm pivotally mounted intermediate ends to the housing, with rear ends of the arms being operatively associated with the respective actuator means.

14. The reel of claim 13 wherein the rear ends of both of said arms include means operatively associated with the actuator means associated with the first pawl.

15. The reel of claim 12, including spring means for biasing said pawls into engagement with their respective ratchets.

16. The reel of claim 15 wherein said spring means are anchored on a crank shaft of the reel.

17. The reel of claim 12 wherein each of said actuator means has a manually manipulatable, movable button projecting through the respective opening in the housing.

* * * * *